United States Patent

Bannon et al.

[11] Patent Number: 5,987,544
[45] Date of Patent: Nov. 16, 1999

[54] SYSTEM INTERFACE PROTOCOL WITH OPTIONAL MODULE CACHE

[75] Inventors: Peter J. Bannon, Concord; Anil K. Jain, Stow; John H. Edmondson, Cambridge; Ruben William Sixtus Castelino, Marlboro, all of Mass.

[73] Assignee: Digital Equipment Corporation, Houston, Tex.

[21] Appl. No.: 08/525,114

[22] Filed: Sep. 8, 1995

[51] Int. Cl.$^6$ .................................................. G06F 12/06
[52] U.S. Cl. .................... 710/100; 710/103; 710/128; 714/805; 711/100
[58] Field of Search .................................... 395/288, 293, 395/470, 445, 446, 471–472, 468–473, 489, 492

[56] References Cited

U.S. PATENT DOCUMENTS

| | | | |
|---|---|---|---|
| 4,392,200 | 7/1983 | Arulpragasam et al. | 364/200 |
| 5,226,146 | 7/1993 | Milia et al. | 711/141 |
| 5,319,766 | 6/1994 | Thaller et al. | 395/425 |
| 5,361,267 | 11/1994 | Godiwala et al. | 371/40.1 |
| 5,388,224 | 2/1995 | Maskas | 710/128 |
| 5,537,573 | 7/1996 | Ware et al. | 395/464 |
| 5,553,258 | 9/1996 | Godiwala et al. | 395/403 |
| 5,553,266 | 9/1996 | Metzger et al. | 395/471 |
| 5,555,382 | 9/1996 | Thaller et al. | 395/293 |
| 5,559,987 | 9/1996 | Foley et al. | 395/471 |
| 5,615,167 | 3/1997 | Jain et al. | 365/230.08 |
| 5,629,987 | 5/1997 | Godiwala et al. | 714/805 |

*Primary Examiner*—Ayaz R. Sheikh
*Assistant Examiner*—Eric S. Thlang
*Attorney, Agent, or Firm*—Hamilton, Brook, Smith & Reynolds, P.C.

[57] ABSTRACT

A computer system includes a plurality of processor modules coupled to a system bus with each of said processor modules including a processor interfaced to the system bus. The processor module has a backup cache memory and tag store. An index bus is coupled between the processor and the backup cache and backup cache tag store with said bus carrying only an index portion of a memory address to said backup cache and said tag store. A duplicate tag store is coupled to an interface with the duplicate tag memory including means for storing duplicate tag addresses and duplicate tag valid, shared and dirty bits. The duplicate tag store and the separate index bus provide higher performance from the processor by minimizing external interrupts to the processor to check on cache status and also allows other processors access to the processor's duplicate tag while the processor is processing other transactions.

2 Claims, 3 Drawing Sheets

SYSTEM INTERFACE PROTOCOL WITH OPTIONAL MODULE CACHE

BACKGROUND OF THE INVENTION

This invention relates generally to computer systems and, more particularly, to computer systems with a cache memory.

As it is known in the art, modern computer systems use various technologies and architectural features to achieve high performance operation. High performance capabilities can be achieved in computer systems which employ several computer central processing units (i.e., CPUs or processors) arranged on modules in a multiprocessor system configuration. In addition to CPU modules, such a multiprocessor system also includes several I/O modules and memory modules, all coupled to one another by a system bus. The CPUs generally perform co-operative or parallel processing as well as multi-tasking operations for execution of several applications running simultaneously, to provide dramatically improved processing performance. The capabilities of the overall system can be also enhanced by providing a cache memory for each one of the CPUs in the computer system.

A cache memory is a relatively small, yet relatively fast memory arranged in close physical proximity to a processor. Cache memory is generally used to store a subset of the information stored in the main memory or disk. The cache memory generally includes a store to store the actual data as well as a tag store to store tag addresses. The tag store also includes status bits of the cache blocks such as valid and shared.

Use of a cache memory is based on a principle that when a processor accesses a location in memory, there is a high probability that the processor will continue to access memory locations surrounding the accessed location for at least a certain period of time. With cache memory a preselected data block from the relatively slow access time main memory is fetched and stored in the relatively fast access cache memory. Accordingly, as long as the processor continues to access data from the cache memory, the overall speed of operation of the processor is maintained at a level significantly higher than would be possible if the processor had to arbitrate for control of the system bus and then perform a memory READ or WRITE operation, with the main memory module, for each data access.

The capabilities of the multiprocessor computer system can be further enhanced by sharing main memory among the CPUs and by operating the system bus in accordance with a SNOOPING bus protocol.

In shared memory multiprocessor systems, it is necessary that the system store a single, correct copy of data being processed by the various processors of the system. Thus, when a processor writes to a particular data item stored in its cache, that copy of the data item becomes the latest correct copy of the data item. The corresponding data item stored in main memory, as well as copies of the data item stored in other caches in the system, becomes outdated or invalid.

In a write back cache scheme, where a processor writes to it's cache, the data item in main memory is not updated until the processor requires the corresponding cache location to store another data item. Accordingly, the cached data item that has been modified by the processor write operation remains the latest copy of the data item until the main memory is updated. In order to maintain coherence, it is, therefore, necessary to implement a scheme to monitor READ and WRITE transactions on the system bus and insure that modified data is delivered from a processors's cache and the tag status bits are modified accordingly.

One technique uses the well known SNOOPING bus protocol. The SNOOPING bus protocol provides coherency between the various cache memories and the main memory of the computer system by monitoring the system bus for bus activity involving addresses of data items that are currently stored in the processor's cache.

Status bits i.e. valid and share are maintained in tag stores associated with each cache to indicate the status of each data item currently stored in the cache.

One possible status bit associated with a particular data item is a VALID bit. The VALID bit identifies if the cache entry has a copy of a valid data item in it, i.e., the stored data item is coherent with the latest version of the data item, as may have been written by one of the processors of the computer system.

Another possible status bit associated with a particular data item is a SHARED bit. The SHARED bit identifies if more than one cache in the system contains a copy of the data item. A cache element will transition into this state if a different processor caches the same data item. That is, if when SNOOPING on the system bus, a first interface determines that another cache on the bus is allocating a location for a data item that is already stored in the cache associated with the first interface, the first interface notifies the other interface by asserting a SHARED signal on the system bus, signaling the second interface to allocate the location in the shared state. When this occurs the first interface will also update the state of its copy of the data item to indicate that it is now in the shared state.

Another possible status bit associated with a particular data item stored in a cache memory can be what is generally called a DIRTY bit. A cache entry is dirty if the data item held in that entry has been updated more recently than main memory. Thus, when a processor WRITES to a location in its cache, it sets the DIRTY bit to indicate that it is now the latest copy of the data item.

Also, in such a multiprocessor computer systems, for every command/address that some other processor module sends across the system bus, the present processor module would have to look up that address in its primary cache, find out if its in there and determine what action to take in response to the command/address.

To minimize this additional cache lookup activity, one or more duplicate tag (DTAG) stores are provided for each processor module. The tag store mentioned above contains information for use in conjunction with its associated cache memory under control of its processor. The tag information in the DTAG cache on the other hand is for use in conjunction with the system bus.

In prior art systems the DTAG store stored the shared and valid bits but not the dirty bit. Therefore, during system bus transactions the present processor module would look up the address in its DTAG to find out if the address is stored in its cache and determine what action to take in response to the command/address coming along the system bus.

Since there is a cache Tag store which can be associated with a primary or backup cache and a DTAG store, it is the goal of the system that each concurrently contain the same information. However, because of time delays in the system processes there may be a time delay between an update of the Status bit in the DTAG cache and the update of the Status bit in the primary cache.

Therefore, the overall system protocol uses the DTAG cache lookup to determine the actual state of a cache entry.

As such, the DTAG status becomes the overall system's "Point of Coherency".

One problem with this approach is that since the duplicate tag store contained only the valid and shared bits, when other processors need to determine whether the present cache contains the most recent copy of the data it must first access the dirty bit which is stored in the tag store associated with the processor or a backup cache. Accordingly, the interface can not directly provide this information. This causes the processor to be continually interrupted and thus affects system performance.

SUMMARY OF THE INVENTION

In accordance with the present invention, a computer system includes a plurality of processor modules coupled to a system bus. Each of said processor modules includes a processor which issues processor commands and addresses, means for interfacing said processor to said system bus, and a duplicate tag store coupled to said interface. The duplicate tag memory includes means for storing duplicate tag addresses and duplicate tag valid, shared and dirty bits. With such an arrangement, a complete and accurate copy of a next higher level tag store is maintained in the interface of the processor. With this arrangement the processor needs to be interrogated only for valid reasons that is to deliver some data to another processor. This improves system performance since the processor bus and processor are not occupied with unnecessary tasks such as informing other processor of the status of its caches.

In accordance with a further aspect of the present invention, a computer system includes a plurality of processor modules coupled to a system bus with each of said processor modules including a processor which issues processor commands and addresses. The computer system also includes means for interfacing said processor to said system bus and a backup cache memory and tag store, with said duplicate tag store having a copy of the contents of the tag store. An index bus is coupled between the processor and the backup cache and backup cache tag store with the index bus carrying only an index portion of a memory address to said backup cache and said tag store. The system also includes a duplicate tag store coupled to said interface, said duplicate tag memory including means for storing tag addresses and tag valid, shared and dirty bits associated with the tag store of the backup cache. With this arrangement by providing a complete and accurate duplicate tag store, the processor is interrogated for valid reasons that is to deliver some data to another processor or to modify tag status of the block in the backup cache. This improves system performance since the processor bus and processor are not occupied with unnecessary tasks such as informing other processor of the status of its higher level caches. Moreover, by providing a separate index bus to the backup cache the index bus can be used to continue to process requests from the processor for private reads and writes to obtain access to its own cache after a on-chip cache miss.

BRIEF DESCRIPTION OF THE DRAWINGS

The foregoing features of the invention, as well as the invention itself, may be more fully understood from the following detailed description taken in conjunction with the accompanying drawings in which.

DESCRIPTION OF THE PREFERRED EMBODIMENTS

Figure 1:
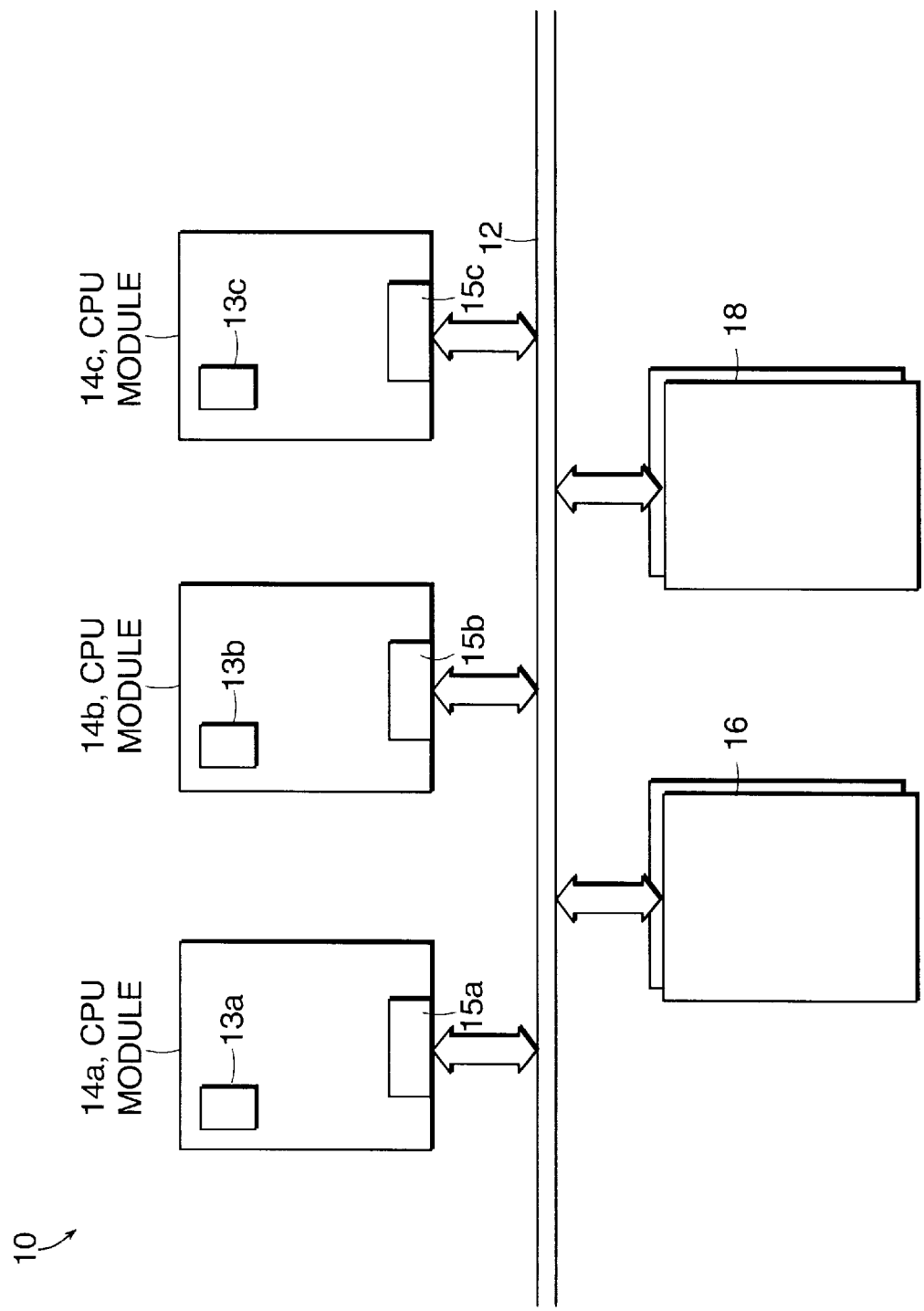
FIG. 1 is a block diagram of multiprocessing system including a plurality of processor modules.

Referring now to FIG. 1, a general purpose, multiprocessor computer system 10 is shown to include a system bus 12 interconnecting a plurality of CPU modules 14a to 14c, a plurality of common or shared I/O modules 16a to 16c and a plurality of common or shared memory modules 18. The CPU modules, include system interfaces 15a to 15c as does the I/O modules and the memory modules whose interfaces are not shown. In addition the CPU modules include central processor devices 13a to 13c.

The system bus, CPU modules, memory modules and I/O modules perform standard computer system functions. The system bus provides a communication medium for the modules attached thereto. The CPU modules execute instructions and transfer data. The memory modules store instructions and data. The I/O modules provide input/output communication via the system bus to the CPUs and the memory modules.

Figure 2:
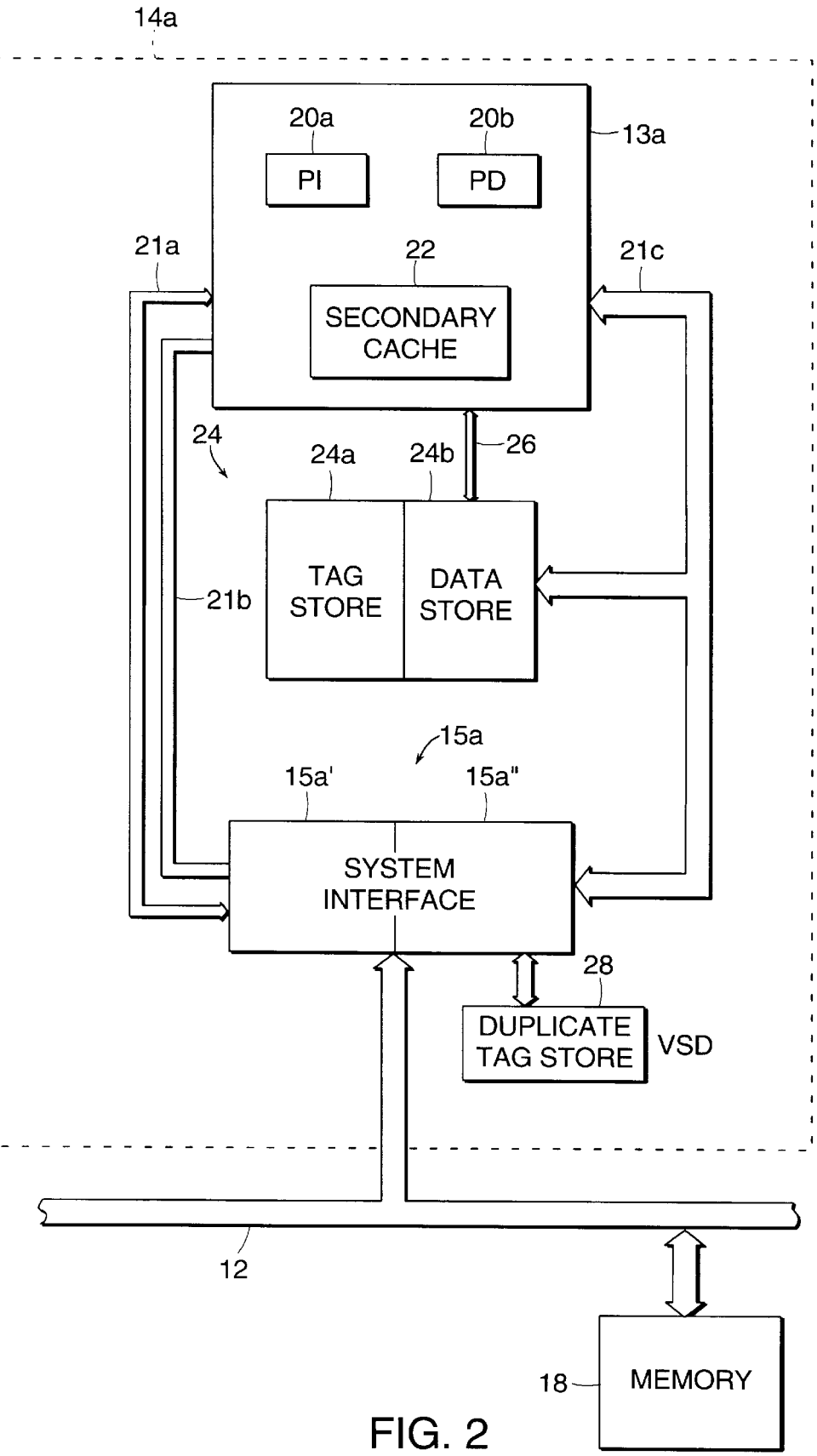
FIG. 2 is a block diagram of one of processor modules of the system of FIG. 1.

Referring now to FIG. 2 an illustrative one of the plurality of CPU modules here module 14a is shown. Each of the modules 14a to 14c are here identical. The central processor device 13a includes a primary instruction cache (PI) 20a, primary data cache (PD) 20b, and a secondary cache 22, as do the other processors 13b to 13c (FIG. 1). The module 14a also includes a backup cache memory (BCACHE) 24 including a tag store 24a and data store 24b. The BCACHE 24 is coupled to the microprocessor via a index bus 26, which is separate from an address bus 21a and command bus 21b which interconnect the central processor device 13a to the system interface 15a, as shown. The central processor device 13a, BCACHE 24, and interface 15a are interconnected by a common data bus 21c. CPU module 14 connects to system bus 12 through the bus interface 15a. The CPU module 14a may contain other elements (not shown) which are used in the operation of the computer system.

Included on CPU module 14a (and each of the other modules 14b, 14c) is a duplicate tag (DTAG) store 28. The duplicate tag 28 store contains bits corresponding to valid, shared and dirty for each tag address entry. By providing a provision for storing dirty bits in the duplicate tag store, less interrupts are necessary to determine the complete status of a block of data stored in the BCACHE 24. That is, when the processor 13a changes a location in cache 24 it sends a command to the interface 15a to change the value of the dirty bit associated with the corresponding block. Therefore, the duplicate tag contains a complete and accurate copy of the tag stored in the BCACHE 24.

This will be shown with an illustrative example. When one of the processors 13a, 13b, 13c, illustratively processor 13a, in the system 10 desires to determine the status of a particular block it (processor 13a) will execute a memory access on the bus 18. The interfaces 15b and 15c of the other processors 13b, 13c snoop on the bus and assert the shared signal and the dirty signal if the block corresponding to the address asserted in the memory access is dirty and if the block is present in their (processors 13b or 13c) respective caches. The processor 13a reads the other the processors 13b, 13c duplicate tag stores 28b, 28c to determine if the block desired by the requesting processor 13a is resident in the processors 13b, 13c backup cache.

If the block is present in the cache of 13b or 13c, the processor 13a also determines from the duplicate tag store whether the dirty bit for that block has been set. If the dirty bit has not been set then the processor 13a can go elsewhere such as main memory for the most up to date copy of the block. The system interface 15a then sends a set shared command to the processor 13b or 13c that had a copy of the block thus changing the state of the cache block to "shared".

If the dirty bit has been set and thus the backup cache 26b or 26c contains the most current copy, the system interface asks the processor 13b or 13c to return the block from the backup cache 26 or its other caches and then changes the state of the block to shared and dirty.

With this arrangement, the processors are interrupted for valid reasons that is to deliver some data to another processor. This improves system performance since the processor bus and processor are not occupied with unnecessary tasks. Moreover, by providing a separate index bus 26 to the backup cache 24 the processor interface can continue to process requests from the processor for private reads and writes to obtain access to its own cache after a on-chip cache miss. When a miss is detected in the Backup cache 24, a read_miss command is sent to the system on the command/address bus 21a, 21b. The separate Bcache index bus allows the interface 15a for example to continue to process read and write requests from the system and the processor 13a.

In operation, microprocessor 13a may place requests on the system bus for data/instructions from memory. Before having to access memory modules 18, microprocessor 13a will first determine if the desired block of data is in its backup Cache before having to obtain the data from Memory Modules 18.

In initiating the memory request, microprocessor 13a places an index address portion (here lower order bits of the address e.g. bits <25:4>) over index bus 26 to simultaneously access the BCache Tag store 24a and Cache DATA store 24b. Tag Data/Status information is provided back to Microprocessor 13a over TAG data bus 26. The Tag Data/Status information is used by microprocessor 13a to determine if the desired block of data is present in the Cache DATA RAMs 34.

The Tag Data information contains both Address information and Status information of the block of data in the Cache DATA RAMs. The address information portion shows which specific block out of all of memory is held in the particular cache entry. The status information portion shows the status of that particular cache block. The status information includes a VALID bit, a SHARED bit and a DIRTY bit as has been described above.

If the memory request, is for example an instruction/command desiring a READ of data, which is capable of being serviced by a cache entry, the microprocessor request will then be satisfied by the cache memory access i.e., there was a HIT in the cache. If there is a HIT, data is provided back to Microprocessor 30 over data lines 21c.

If the memory request is not satisfied there was a MISS in the cache. In order to obtain the data the Microprocessor needs to access main memory. For example, if during the READ, the cache state is not VALID, or the addresses in the Tag RAMs do not match the address required by the Microprocessor, i.e., that block is not in the cache, Microprocessor 13a will issue a command to a address interface portion 15a' of the interface 15a. Address Interface 15a' responds with an ACKNOWLEDGE (ACK) sent along ACK lines and issues a command to the system bus 12 requesting data to be sent back from one of the Memory Modules 18. Data is returned across the System Bus 12 to data interface portion 15a". Address Interface 38 is the controller for the data Interface portion 15a". For any data movement associated with any command/address received by Address Interface 15a', the Address Interface determines the type of data movement (e.g., data is to be received off the system bus) and sends control signals indicating such to Data Interface 15a". Once the Data Interface receives the data, it signals the processor 13a that the requested data has come back. The data is sent out over data bus 21c and is written into both the backup cache 24 and also into the microprocessor's secondary cache 22 and primary caches 20a or 20b by way of data bus 21c.

As shown in FIG. 1, there can be multiple CPU Modules in the computer system configuration. As such, if any other CPU Module 14, or even any I/O Module 16 on the System Bus 12, issues a command to some address, it can affect a cache block of another CPU Module. The status of that block is clearly established and the appropriate tag status bits are set. Table 1 below shows what effect system bus actions have on the state of a given cache block.

TABLE 1

| System Bus Operation | Tag Probe Results | Next Cache State |
|---|---|---|
| Read | Match OR Invalid | No Change |
| Write | Match OR Invalid | No change |
| Read | Match AND $\overline{\text{Dirty}}$ | Shared, $\overline{\text{Dirty}}$ |
| Read | Match AND Dirty | Shared, Dirty |
| Write | Match | Invalid |

In Table 1, the "System Bus Operation" column shows the command on System Bus 12. The "Tag Probe Results" column shows the result of a lookup of the address of the command on the system bus in Tag Store to determine if the address is there (i.e., a Match) and determine information about the addressed block (e.g., its status). The "Next Cache State" column shows the status of the cache as a result of actions taken based upon the System Bus Operation undertaken and Tag Probe Results.

In such a multiple CPU system, for every command/address that some other commander module sends across the system bus, the present CPU Module would have to look up that address in its local Cache Tag, find out if its in there and determine what action to take in response to the command/address.

To minimize this additional Cache Tag RAM lookup activity, one or more Duplicate Tag Stores 28 (DTAGs) are provided. This DTAG approach allows for two identical copies of the Cache memory Tag information. The information in the Cache Tag RAMs 24a will be for use in conjunction with Microprocessor 13a. The information in the DTAG RAMs 28 will be for use in conjunction with system bus 12.

Therefore, as system bus commands come along System Bus 12, the present CPU Module would look up the command/address in its DTAG 28 to find out if the address is there and determine what action to take in response to the command coming along the system bus.

Figure 3:
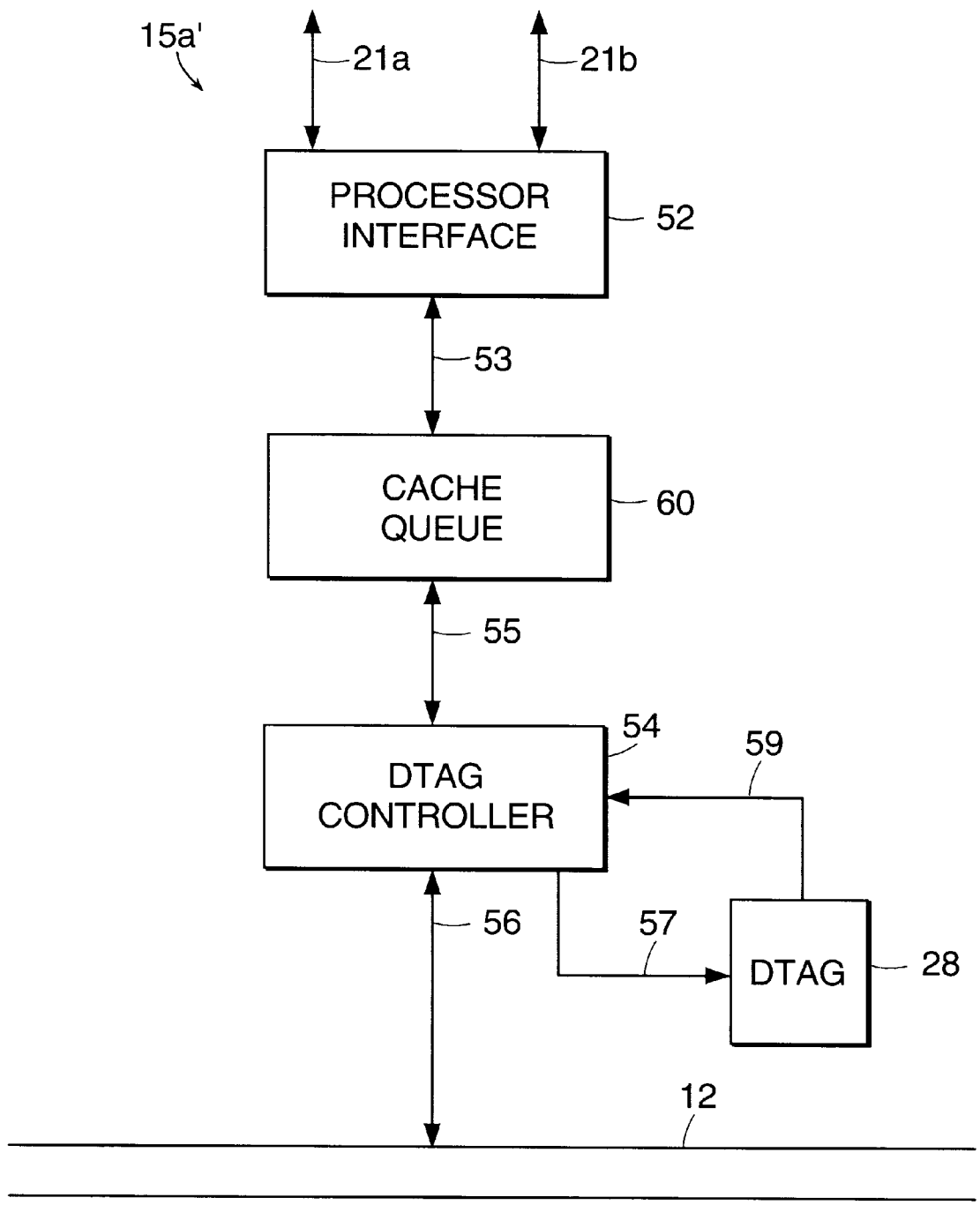
FIG. 3 shows in more detail the address interface of one of the CPU modules.

Referring now to FIG. 3, address Interface 15a' on CPU Module 14a is shown to include microprocessor interface 52 which transmits and receives COMMAND/ADDRESS and ACK signals over signal lines 21a and 21b respectively. Address Interface 15a' also includes a DTAG Controller 54. DTAG Controller 54 transmits and receives COMMAND, ADDRESS and CONTROL signals over signal lines 56 from System Bus 12. DTAG 28 implemented as static random access memory are coupled to DTAG Controller 54.

Address/Status/Tag information is provided to DTAG 28 over signal lines 57 and Status/Tag information is provided back to DTAG Controller 54 over signal lines 59. Coupled between Microprocessor Interface 52 and DTAG Controller 54 is a Cache Queue 60. Cache Queue 60 includes a series of Cache Queue locations. Signal lines 21a also couple Microprocessor Interface 52 to DTAG Controller 54.

System bus 18 is a highly pipelined bus. On system bus 18 operation, e.g., the processing of an instruction/command, is divided into a number of stages and different tasks related to the operation are allowed to be in different stages of completion at any one time. Cache Queue 60 assists in the handling of pipelined commands coming off System Bus 18. To maintain optimum system bus performance it is desirable that the system bus operation not be slowed down.

The protocol for the system interface 15a to write a block without any competing reads or writes from another processor is as follows: If processor 13a desires to write to a block stored in its cache system (primary, secondary or backup), one of two scenarios occur. If the block desired access to is clean (that is the dirty bit is not set) and the block is private (that is the shared bit is not set), the processor 13a on processor module 14a sends a command to the system interface 15a to seek permission to write the block. In general the system interface 15a will make the block dirty in its duplicate tag store and acknowledge the command to the processor 14a. Then the microprocessor 13a completes the write to the cache and marks its tags as dirty/private.

If the block desired access to by the processor 13a is in the face of a competing read from system interfaces 15b or 15c a different scenario occurs. In this case the system interface 15a which was snooping the system bus determines that another one of the processors has won arbitration of the bus 18 and that other processor is allowed to perform the read operation. Thus, since the other processor reads the block, the system interface 15a backs off processor 14a (by taking away ownership of the command/address buses 21a, 21b) and does not acknowledge a "set dirty" command. When the read from the other processor hits in the duplicate tag store 15a, the system interface forwards a set "shared" command to the processor 14a.

After set shared is completed, processor 14a regains control of the busses 21a, 21b. It restarts the original write operation and determines that the state of the block has changed to the shared state. Thus, it issues a write to memory request. The system interfaces 15b and 15c see the write to main memory request. This request is interpreted as an invalidate command by all of the other processors. That is, the system interfaces 15b, 15c of all of the other processors 13b and 13c snoop the bus and check the address in the respective duplicate tag store and invalidate any copies of that block. Those processors which have a copy of the block will have those blocks invalidated by a command from the respective system interface 15b, 15c.

The protocol for the system interface when a completing a write in the presence of a blocking write from another processor works as follows: If processor 13a desires to write to a block stored in its cache system (primary, secondary or backup), one of two scenarios occur. If the block desired access to is clean (that is the dirty bit is not set) and the block is private (that is the shared bit is not set), the processor 14a sends a command to the system interface 15a to seek permission to write the block. In general the system interface will make the block dirty in its duplicate tag store and acknowledge the command to the processor 14a. Then the microprocessor 13a completes the write to the cache and marks its tags as dirty/private as generally explained above.

If the block desired access to by the processor 13a is also requested by a second processor such as 13b or 13c which desires to write to the block a different scenario occurs. In this case the system interface 15a which was snooping the system bus determines that another one of the processors 13b or 13c has won arbitration of the bus and is allowed to perform a write operation. Thus, since the other processor writes the block, the system interface 15a backs off processor 14a (by taking away ownership of the command/address buses 21a, 21b) and issues an invalidate command to that processor's caches. After the invalidate command is completed, processor 13a regains control of the busses 21a, 21b. It restarts the original write operation and determines that the state of the block has been changed to invalid state. Thus, it issues a read memory request with an intent to modify the block. The respective CPU would determine for the respective system interface 15b or 15c that just wrote the block, that the block is shared and clean and would thus fill the block (i.e. fetch the block) from main memory. That is, typically, another CPU 13b or 13c would have the block in the "shared and clean" state and thus it can be provided from main memory. Whatever the state of the block in another's CPU (13b or 13c) cache, processor 13a will issue a read memory request with an intent to modify the block. The filled block is now shared and the processor 13a in order to write the block issues a write to memory request. Thus, it issues a write to memory request. The system interfaces 15b and 15c see the write to main memory request. This request is interpreted as an invalidate command by all of the other processors. That is, the system interfaces 15b and 15c of all of the other processors snoop the bus and check the address in the respective duplicate tag store and invalidate copies of that block. Those processors 13b and 13c which have a copy of the block will have those blocks invalidated by a command from their respective system interface 15b or 15c.

With this approach since the duplicate tag stores of each processor have complete and coherent copies of the tag stores of their respective backup caches, obtaining the status information of blocks is much easier and faster. Further, the system interface interrupts its processor for invalidates only when it detects a write from another processor to a block which is present in its duplicate tag store. The system interface also interrupts its processor for a set shared command when it detects a read form another CPU that hits in the DTAG. This provides performance advantages for buses 21a and 21b, since the duplicate tag stores reduce unnecessary traffic on the buses 21a, 21b of each module. This also eliminates unnecessary interruptions being issued to the processor 13a as well as processors 13b and 13c.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A protocol for maintaining accurate copies of status bits in a duplicate tag store of a first system bus interface which couples a first processor having a first cache memory system to a system bus, with at least one other processor with at least one other cache memory and at least one other system interface comprises the steps of:

determining the status of a block desired access to by the first processor;

if the block desired access to is clean and private, sending a command to the first system interface to seek permission to write the block and setting the block dirty in its duplicate tag store; and acknowledging the command to the first processor;

if the block desired access to is competing with a read from at least one other system interface, removing ownership of the command/address bus and which not acknowledging a "set dirty" command from the first processor;

providing a set "shared" command to the processor when the read from the at least one other processor hits in the duplicate tag store of the first processor;

restarting the original write operation and determining that the state of the block has changed to the shared state; and executing a write to memory request which invalidates any copies of that block in the at least one other processor's cache.

2. A protocol for maintaining accurate copies of status bits in a duplicate tag store of a first system bus interface which couples a first processor having a first cache memory system to a system bus, with at least one other processor with at least one other cache memory and at least one other system interface comprises the steps of:

determining the status of a block desired access to by the first processor;

if the block desired access to is clean and private, sending a command to the first system interface to seek permission to write the block and setting the block dirty in its duplicate tag store; and acknowledging the command to the first processor;

if the block desired access to is competing with a write from at least one other system interface, removing ownership of the command/address and issues an invalidate command to that processor's caches;

after the invalidate command is completed, restarting the original write operation and determining that the state of the block has been changed to invalid state;

issuing a read memory request with an intent to modify the block;

filling the block from main memory; and issuing a write to memory request which is interpreted as an invalidate command by the at least one other processor to invalidate the copy of the block in its cache.

* * * * *